Patented Apr. 21, 1942

2,280,748

UNITED STATES PATENT OFFICE 2,280,748

ISOMERIZATION OF NORMAL PARAFFINS

Van B. Calhoun, Baton Rouge, La., assignor to Standard Oil Development Company, a corporation of Delaware No Drawing. Application December 28, 1939, Serial No. 311,283

10 Claims. (Cl. 260—676)

The present invention relates to an improved method for isomerizing normal straight chain paraffin hydrocarbons, and more specifically to a new class of catalyst activators for such reaction.

It is known that normal paraffin hydrocarbons can be isomerized by means of Friedel-Crafts catalysts, such as aluminum chloride or bromide, zinc chloride, ferric chloride, and the like. It is likewise known that the catalyst in almost every case requires an activator, since without such activator the activity of the catalyst diminishes very rapidly. As activators, hydrogen halides, such as hydrogen chloride, have been mainly employed.

It has now been found that superior results may be obtained by using the free halogens, especially chlorine or bromine, as activators for Friedel-Crafts catalysts in the isomerization reaction. The yields of branch chain hydrocarbons are considerably greater than those obtained by the use of known activators, such as hydrogen chloride. These activators have a further advantage over hydrogen chloride in the fact that they promote the formation of the branch chain isomers of a given hydrocarbon with less tendency to form hydrocarbons of a higher or lower number of carbon atoms in the molecule. The new class of activators are particularly effective when used with aluminum halide catalysts.

The present process is capable of converting normal paraffins, such as normal butane, normal pentane, normal hexane, normal heptane and higher homologs into their corresponding branched or isoforms, such as isobutane, isopentane, and the like. The feed stock may also comprise mixtures of more than one of these straight chain paraffins, or, if convenient, the paraffinic hydrocarbon mixture may contain small proportions of branched chain paraffins, although for greatest efficiency the hydrocarbon feed stock should comprise essentially straight chain paraffins. Mixed paraffins, such as straight run naphthas, may thus be converted into isomeric mixtures which have an increased value with respect to anti-detonation qualities when used as motor fuels and with respect to the facility with which they may enter into further chemical reactions to produce alkylation products when reacted with olefins. In general, any hydrocarbon mixture composed predominantly of saturated straight chain hydrocarbons is suitable as a feed stock for the process herein outlined. A product containing substantial amounts of branched chain isomers may be separated from the reaction medium and fractionated within the desired boiling range. The constituents boiling above and below the desired range may then be returned to the isomerization reactor to suppress their further formation or to be further isomerized to more useful products.

The reaction may be carried out in batch, for example, in a bomb or autoclave, preferably fitted with agitating apparatus; but continuous flow processes are preferred in which the normal paraffin is passed in vapor or liquid condition through a reaction vessel containing the catalyst which may be in lump or powdered form and may be supported on a carrier such as silica, alumina gels thereof, activated carbon, asbestos, pumice, clay and the like. The hydrocarbon feed stock may be pumped through a horizontal chamber or vertical bed of the catalyst. The catalyst may also be used in finely divided form and may be passed through the reaction zone suspended in the materials being treated. The catalysts may consist entirely of Friedel-Crafts agents or may be modified by the addition of alkali or alkaline earth halides, such as potassium or sodium chloride or calcium or magnesium halides.

The free halogen activator may be added to the feed stock, or it may be added to the reaction chamber by independent means so as to be distributed more evenly through the catalyst mass. It is not necessary to add the activator continuously, and it may be added from time to time as the catalyst shows deterioration. The amount of the activator varies with the catalyst, its age and the temperature and other conditions, but ordinarily the amount is from 0.5% to 5% of the feed stock treated.

The isomerized product is withdrawn from the apparatus and separated by distillation from the unconverted hydrocarbons, which may be recirculated for further reaction. In continuous or semicontinuous operations any unreacted free halogen or reaction products thereof recovered from the final products may be returned to the reaction zone. In such operations the amount of fresh halogen added may be reduced to from .05 to .5% or more of the fresh feed.

The conditions for isomerizing with the present catalysts and activators are much the same as those formerly employed with the hydrogen halide activators. A wide temperature range may be employed, for example, from about 30° to about 400° F. The higher temperatures, that is, 300° to 400° F., are preferably employed when the feed stocks are in vapor phase and there may be some decomposition at the same time. At the lower temperatures, for example, from 70° to 250° F., the isomerization may be effected in the liquid phase and without side reactions. The time of the reaction varies with other factors, such as temperature, the amount of catalyst, the particular catalyst used and the particular feed stock being treated. In general, however, the time of reaction may be from ½ to 30 hours; and the conditions are usually adjusted so as to obtain a conversion of 50% to 75% at a temperature of, for example, 100° to 250° F. for butane and 75° to 125° F. for pentane. The amount of catalyst to be used varies widely, depending upon the particular hydrocarbon which is to be converted, the amounts ranging from 2% to 100% by weight of the hydrocarbon material present in the reactor. In the case of the conversion of butane, when using aluminum chloride or bromide as the catalyst in a batch process, a suitable proportion of catalyst has been found to be about 10% to about 50% by weight, preferably about 15%, based on the amount of feed stock used, and the corresponding amount of free halogen activator, such as free chlorine, is advantageously about 2% by weight of the feed stock.

The reaction is preferably carried out under liquid phase conditions. Hence, any temperature below the critical temperature of the feed stock may be employed, although it is preferable to use the temperatures specified above. Sufficient superatmospheric pressure may be employed to maintain the reactants as well as the reaction products in the liquid phase under the reaction conditions obtained. In particular, liquid phase operations are conducive to the production of ultimate high yields and to the carrying out of the process in a continuous manner. It is to be understood, however, that the process is not only applicable to continuous operation, but it is contemplated to carry the same out in batch type apparatus for single batch operation. Where the reaction is carried out in the liquid phase, it has been found advantageous to intensively agitate the reaction mixture so that intimate contact is established between the feed and the catalyst. The catalyst may be employed as a slurry, in which case a mechanical agitator propelled by external means is preferably inserted in the reactor. Where a bed type of catalyst is employed, it is well to employ a liquid phase operation and to force the liquid hydrocarbon feed into the reactor under pressure through jets of restricted internal diameter, or to employ turbo mixers or some similar dispersion means for increasing intimacy of contact between the catalyst and the feed. The direction of flow of the feed stock may be upward or downward through the catalyst bed; but where a powdered catalyst is used, an upward flow is preferable.

A comparison of the results obtained in the following examples will show clearly the advantages obtained by proceeding in accordance with the present invention.

Example 1

Liquefied n-butane, together with 15% by weight of pure aluminum chloride, was agitated in a closed reaction vessel in the liquid phase for 12 hours at a temperature of about 212° F. An analysis of the contents of the reaction vessel showed a yield of 31.5% of isobutane, 0.6% of hydrocarbons lighter than butane and a trace of hydrocarbons heavier than butane, the total conversion being 32.1%. This shows a selectivity of 98.1% as to the yield of isobutane, compared with the total conversion.

Example 2

A second portion of n-butane was treated in a manner exactly similar to the portion treated in Example 1, except that 2.0% by weight of hydrogen chloride was added to the reaction mixture. After 12 hours agitation at 212° F. there was obtained a yield of 42.2% of isobutane, 0.9% of hydrocarbons lighter than butane and a trace of hydrocarbons heavier than butane, making a total conversion of 43.1%. This represents a selectivity of 97.8% as to the yield of isobutane.

Example 3

A further portion of n-butane was treated as in Example 2, except that 2.0% of chlorine was used as the activator instead of the hydrogen chloride. After agitation for 12 hours at about 212° F., there was obtained a yield of 64.5% of isobutane and traces only of hydrocarbons lighter and heavier than butane. The total conversion is thus 64.5%, and the selectivity as to isobutane is approximately 100%.

Example 4

A further portion of n-butane was treated as in Example 1, except that pure aluminum bromide was used instead of aluminum chloride. The yield of isobutane was 30.0%, that of hydrocarbons lighter than butane 7.7%, and that of hydrocarbons heavier than butane 2.2%, the total conversion being 39.9%, and the selectivity as to isobutane 75.2%.

Example 5

N-butane was treated as in Example 4, except that in this case the aluminum bromide catalyst contained traces of free bromide. The yields were 62.5% isobutane, 4.2% lighter hydrocarbons and 1.0% heavier hydrocarbons, the total conversion being 67.7% and the selectivity as to isobutane being 92.3%.

The results obtained in the foregoing examples are summarized in the following table:

| Ex. No. | Feed | Catalyst | | Activator | | Temp., °F. | Time, hours | Yields | | | Percent conversion | Isobutane selectivity |
|---|---|---|---|---|---|---|---|---|---|---|---|---|
| | | Kind | Weight percent of feed | Kind | Weight percent of feed | | | Isobutane | Lighter hydrocarbons | Heavier hydrocarbons | | |
| 1 | N-butane | AlCl₃ | 15 | None | | 212 | 12 | 31.5 | 0.6 | Trace | 32.1 | 98.1 |
| 2 | ---do--- | AlCl₃ | 15 | HCl | 2.0 | 212 | 12 | 42.2 | 0.9 | Trace | 43.1 | 97.8 |
| 3 | ---do--- | AlCl₃ | 15 | Cl₂ | 2.0 | 212 | 12 | 64.5 | Trace | Trace | 64.5 | 100 |
| 4 | ---do--- | AlBr₃ | 15 | None | | 212 | 12 | 30.0 | 7.7 | 2.2 | 39.9 | 75.2 |
| 5 | ---do--- | AlBr₃ | 15 | Br₂ | Trace | 210 | 12 | 62.5 | 4.2 | 1.0 | 67.7 | 92.3 |

The present invention is not to be limited by any of the examples, which are given by way of illustration only, nor by any theory of the reaction mechanism, but only by the following claims in which it is desired to claim all novelty inherent in the invention.

I claim:

1. In a process for isomerizing normal paraffin hydrocarbons having a boiling range not higher than that of a straight run naphtha with a Friedel-Crafts type catalyst, wherein the paraffins to be isomerized are contacted with said catalyst in an isomerizing zone; the improvement in said process which comprises activating said catalyst by introducing a small proportion of free halogen into said isomerizing zone.

2. Process according to claim 1 in which the catalyst is an aluminum halide.

3. Process according to claim 1 in which the catalyst is aluminum chloride and the activator is free chlorine.

4. An improved process for isomerizing a normal paraffin hydrocarbon having a boiling range not higher than that of a straight run naphtha which comprises subjecting the same to the action of a Friedel-Crafts type catalyst in an isomerizing zone maintained at a temperature between 30° F. and 400° F. and introducing into said isomerizing zone a small proportion of a free halogen to activate said catalyst.

5. Process according to claim 4 in which the catalyst is aluminum chloride and the activator is free chlorine.

6. An improved process for isomerizing a normal paraffin hydrocarbon having a boiling range not higher than that of a straight run naphtha which comprises subjecting the same in the liquid phase to the action of a Friedel-Crafts type catalyst in an isomerizing zone maintained at a temperature between 70° F. and 250° F. and introducing into said zone a small proportion of free halogen to activate said catalyst.

7. Process according to claim 6 in which the catalyst is aluminum chloride and the activator is free chlorine.

8. An improved process for isomerizing normal butane which comprises subjecting the same to the action of an aluminum halide catalyst in an isomerizing zone, maintaining said zone between about 100° F. and about 250° F. and introducing into said zone a small proportion of free halogen to activate said catalyst.

9. An improved process for isomerizing normal butane which comprises subjecting the same in the liquid phase to the action of about 10% to about 50% by weight of aluminum chloride in an isomerizing zone, maintaining said zone at a temperature between about 100° F. to 250° F. and introducing into said zone free halogen to activate said catalyst, the amount of said halogen so introduced being between .05 and 5% by weight of the normal butane.

10. An improved process for isomerizing normal butane which comprises subjecting the same in the liquid phase to the action of about 15% by weight of aluminum chloride in an isomerizing zone, maintaining said zone at a temperature of about 212° F. and introducing free chlorine into said zone, the amount of chlorine so introduced being about 2% of the butane.

VAN B. CALHOUN.